United States Patent
Kurata

(10) Patent No.: US 11,443,169 B2
(45) Date of Patent: Sep. 13, 2022

(54) ADAPTATION OF MODEL FOR RECOGNITION PROCESSING

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1106 days.

(21) Appl. No.: 15/048,318

(22) Filed: Feb. 19, 2016

(65) Prior Publication Data

US 2017/0243114 A1    Aug. 24, 2017

(51) Int. Cl.
*G06N 3/04*    (2006.01)

(52) U.S. Cl.
CPC ......... *G06N 3/0472* (2013.01); *G06N 3/0454* (2013.01)

(58) Field of Classification Search
CPC ...... G06F 16/9032; G06F 40/44; G06F 40/55; G06F 16/637; G06N 3/04; G06N 3/0427; G06N 3/082; G06N 3/0472; G06N 3/0454; G10L 15/063; G10L 15/075; G10L 15/14; G10L 21/0208; G10L 15/20; G10L 2021/02082
See application file for complete search history.

(56) References Cited

U.S. PATENT DOCUMENTS

| | | | |
|---|---|---|---|
| 7,587,374 B1* | 9/2009 | Lynch | G06N 7/005 706/16 |
| 8,660,973 B1* | 2/2014 | Feigenbaum | G06N 5/02 706/47 |
| 9,147,129 B2* | 9/2015 | Liu | G06K 9/6256 |
| 2008/0167863 A1* | 7/2008 | Choi | G10L 21/0208 704/208 |
| 2011/0071965 A1* | 3/2011 | Long | G06N 20/00 706/12 |
| 2013/0030792 A1* | 1/2013 | Zhao | G06F 40/55 704/9 |
| 2013/0253930 A1* | 9/2013 | Seltzer | G10L 15/063 704/236 |

(Continued)

OTHER PUBLICATIONS

'Acoustically Discriminative Training for Language Models': Kurata, IEEE, 2009.*

(Continued)

*Primary Examiner* — Michael J Huntley
*Assistant Examiner* — Peter D Coughlan
(74) *Attorney, Agent, or Firm* — Tutunjian & Bitetto, P.C.; Randall Bluestone

(57) ABSTRACT

A computer implemented method for adapting a model for recognition processing to a target-domain is disclosed. The method includes preparing a first distribution in relation to a part of the model, in which the first distribution is derived from data of a training-domain for the model. The method also includes obtaining a second distribution in relation to the part of the model by using data of the target-domain. The method further includes tuning one or more parameters of the part of the model so that difference between the first and the second distributions becomes small.

25 Claims, 10 Drawing Sheets

(56) References Cited

U.S. PATENT DOCUMENTS

| | | | | |
|---|---|---|---|---|
| 2014/0337026 A1* | 11/2014 | Ichikawa | .............. | G10L 15/063 704/243 |
| 2015/0088783 A1* | 3/2015 | Mun | ...................... | G06Q 10/04 705/36 R |
| 2015/0332670 A1* | 11/2015 | Akbacak | ................. | G06F 40/40 704/9 |
| 2015/0363688 A1* | 12/2015 | Gao | ........................ | G06N 3/04 706/27 |

OTHER PUBLICATIONS

Chopra, S. et al., "DLID: Deep Learning for Domain Adaptation by Interpolating between Domains," ICML Workshop on Challenges in Representation Learning, Jun. 2013. (pp. 1-8).

Christensen, H. et al., "Combining in-domain and out-of-domain speech data for automatic recognition of disordered speech," University of Sheffield Department of Computer Science, Aug. 2013. (pp. 1-5).

Ganin, Y. et al., "Unsupervised Domain Adaptation by Backpropagation," Proceedings of the 32nd International Conference on Machine Learning, Sep. 2014. (pp. 1-10).

* cited by examiner

ADAPTATION OF MODEL FOR RECOGNITION PROCESSING

BACKGROUND

The present invention, generally, relates to domain adaptation associated with machine learning and, more particularly, to adaptation of a model for recognition processing to a target-domain.

Deep Neural Networks (DNNs), which are Artificial Neural Networks (ANNs) with multiple layers, have been widely used as models for various recognition processing systems such as Automatic Speech Recognition (ASR) systems, etc. It has been shown that the DNNs, including Feed-Forward Neural Networks (FFNNs), Convolutional Neural Networks (CNNs) and Recurrent Neural Networks (RNNs), can achieve superior accuracy as an acoustic model for the ASR on a variety of speech recognition benchmarks.

Generally, training of the DNN from large scale data (e.g. ~10K hours of audio data in ASR) requires huge computational cost and a considerably long time. Therefore, the DNN built from the large scale data across diverse domains may often be utilized for multiple applications instead of constructing an application-specific DNN trained for a particular target-domain from scratch.

Such DNNs can perform well for in-domain data that is covered by training data for the DNN. However, its accuracy may deteriorate for data from an out-of-domain that is different from the training-domain.

Some adaptation approaches for the DNN have been known. It has been shown that application of linear transformations to not only input features but also outputs of the internal layers yields better results in hybrid ANN/HMM (Hidden Markov Model) models (R. Gemello et al., Linear hidden transformations for adaptation of hybrid ANN/HMM models, Speech Communication, vol 49, no. 10, pp. 827-835, 2007). Also it has been demonstrated that adaptation neural network, which transforms the features and feeds them as a new input of the original speaker independent neural network, is effective (O. Abdel-Hamid et al., Rapid and Effective Speaker Adaptation of Convolutional Neural Network Based Models for Speech Recognition, Proceedings of INTERSPEECH 2013, 1248-1252, 2013.). However, aforementioned approaches both require additional computation in run-time and/or additional units/layers in the DNNs.

Also supervised adaptation can be conducted if training data with supervised information for target-domain is available. However, the supervised adaptation requires additional costs and sometimes does not work well. Also, preparing training data with supervised information such as correct labels may be practically labor intensive.

What is needed is a method, associated computer system and computer program product capable of adapting a model for recognition processing to target-domain data without involving any additional computation during recognition processing and requiring any supervised information.

SUMMARY

According to an embodiment of the present invention, there is provided a computer implemented method performed by a computer device for adapting a model for recognition processing to a target-domain. The method includes preparing a first distribution in relation to a part of the model, in which the first distribution is derived from data of a training-domain for the model. The method also includes obtaining a second distribution in relation to the part of the model by using data of the target-domain. The method further includes tuning one or more parameters of the part of the model so that difference between the first and the second distributions becomes small.

The model adapted by the method according to the embodiment of the present invention can have improved accuracy for the target-domain data without involving any additional computation during recognition processing and without requiring any supervised information.

According to a preferable embodiment of the present invention, the model includes a neural network with an input layer and a plurality of layers on top of the input layer. The part is one or more lower layers among the plurality of the layers and the input layer. The first and second distributions are output distributions from the part of the neural network by feeding the data into the input layer from the training-domain and the target-domain, respectively.

Since the part of the neural network is adjusted so that the part can transform the data of the target-domain into a space of the training-domain while keeping a remaining part of the neural network with discrimination capability, difference between the target-domain and the training-domain can be preferably absorbed at the one or more lower layers of the neural network, which enables the data of the target-domain to leverage discrimination capability provided by the neural network. Therefore, accuracy can be improved for the target-domain data without modifying network topology of the neural network.

According to other preferable embodiment of the present invention, the part includes a convolutional layer and a subsampling layer on top of the convolutional layer, and the first and second distributions are output distributions from the subsampling layer.

Therefore, even though the model includes the convolutional and subsampling layers, adaptation can be achieved appropriately since information actually discarded in the subsampling layer of the model can be preferably ignored for adaptation.

According to another preferable embodiment of the present invention, the data of the training-domain and the data of the target-domain both may be split into a plurality of classes in an unsupervised manner. The plurality of the classes includes a class representing utterance regions and a class representing silence regions. Both the first and the second distributions include a distribution for each class. The method further includes calculating difference between the first and the second distributions for each class and combines the calculated differences over the plurality of the classes.

Therefore, accuracy of the model can be further improved since the data of the silence and utterance regions can be separately taken into consideration.

According to further another preferable embodiment of the present invention, the data of the training-domain and the data of the target-domain both may be split into a plurality of classes by utilizing supervised information. The plurality of the classes includes each class representing a phone, a group of phones, or a group of multi-phones. Both the first and the second distributions include a distribution for each class. The method further includes calculating difference between the first and the second distributions for each class and combines the calculated differences over the plurality of the classes.

Therefore, accuracy of the model can be further improved since the data of each phone, each group of phones or each group of multi-phones can be separately taken into consideration.

According to further another preferable embodiment of the present invention, the method includes further performing an additional training to the tuned model by using training data with a label from the target-domain in a supervised manner.

Since the part of the model can extract a good abstracted representation for the data of the target-domain, the additional training may be worth trying. Accuracy of the model can be expected to be further improved by the additional supervised training.

Computer systems and computer program products relating to one or more aspects of the present invention are also described and claimed herein.

Further, according to other embodiment of the present invention, there is provided a computer implemented method performed by a processor for adapting a neural network to a target-domain. The method includes preparing a first output distribution from one or more lower layers of the neural network on a memory operably coupled to the processor, in which the first output distribution is derived from data of a training-domain for the neural network. The method also includes calculating a second output distribution from the one or more lower layers of the neural network by feeding data of the target-domain into the neural network. The method further comprises tuning one or more parameters of the one or more lower layers of the neural network by calculating a change in the one or more parameters so as to minimize difference between the first and the second output distributions based on the first and the second output distributions stored on the memory.

The neural network adapted by the method according to other embodiment of the present invention can have improved accuracy for the target-domain data without modifying any network topology of the neural network, without involving any additional computation during run-time, and without requiring any supervised information.

Further, according to another embodiment of the present invention, there is provided a computer system for adapting a model for recognition processing to a target-domain. The computer system includes a preparing module, an obtaining module and a tuning module. The preparing module is configured to prepare a first distribution in relation to a part of the model, in which the first distribution is derived from data of a training-domain for the model. The obtaining module is configured to obtain a second distribution in relation to the part of the model by using data of the target-domain. The tuning module is configured to tune one or more parameters of the part of the model so that difference between the first and the second distributions becomes small.

Additional features and advantages are realized through the techniques of the present invention. Other embodiments and aspects of the invention are described in detail herein and are considered a part of the claimed invention.

BRIEF DESCRIPTION OF THE DRAWINGS

The forgoing and other features and advantages of the invention are apparent from the following detailed description taken in conjunction with the accompanying drawings in which.

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to computer implemented methods, computer systems and computer program products for adapting a model for recognition processing.

Figure 1:
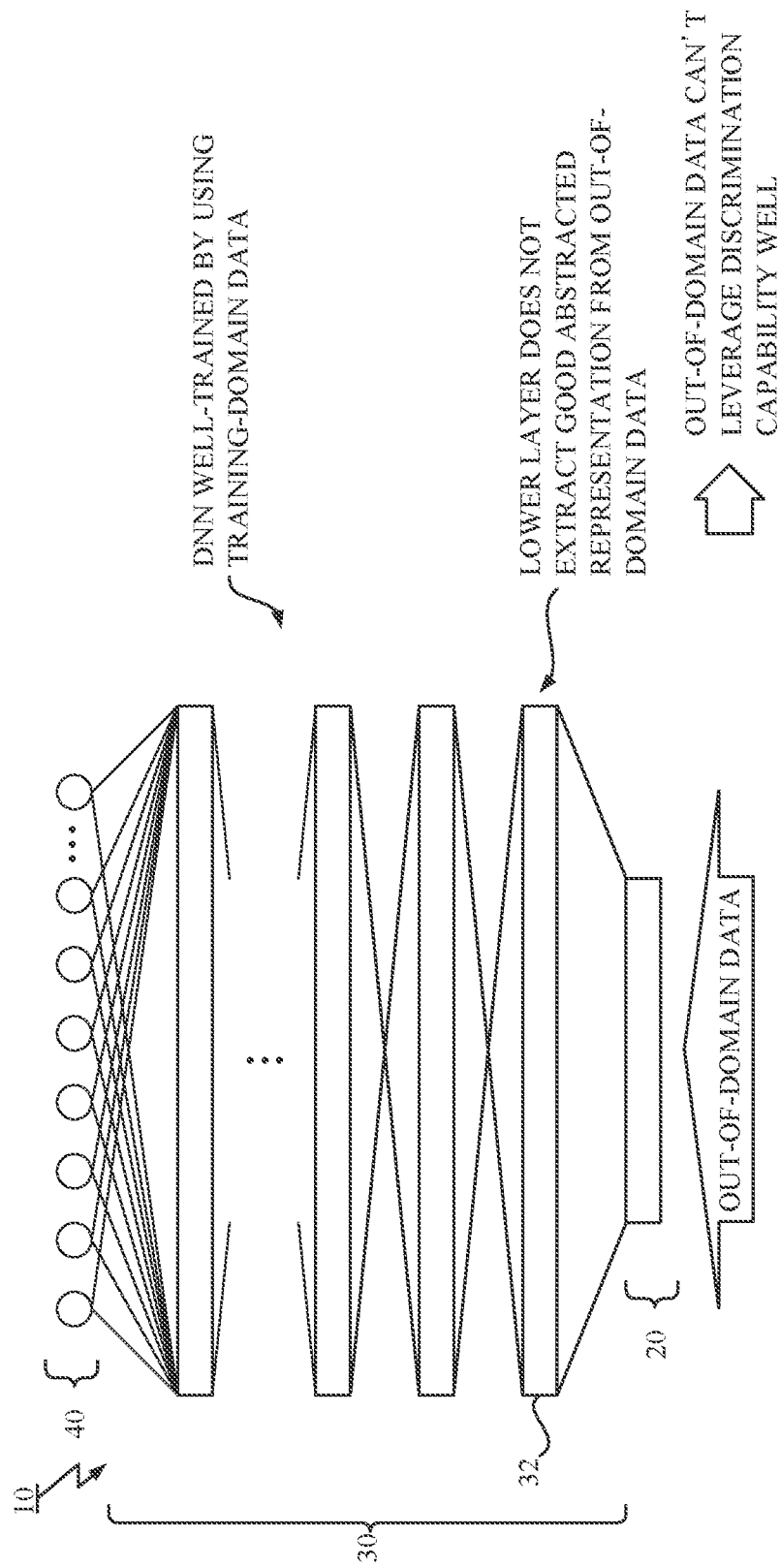
FIG. 1 shows a deep neural network as a model for recognition processing, which is well-trained by using large scale training data.

A deep neural network (DNN) including FFNN (Feed Forward Neural Network), CNN (Convolutional Neural Network) and RNN (Recurrent Neural Network) is one of the most promising models used in a variety of recognition processing such as speech recognitions, etc. FIG. 1 shows a DNN 10 as a model for recognition processing. The DNN 10 may have one or more hidden layers 30 with a plurality of hidden units between an input layer 20 and an output layer 40. The DNN 10 shown in FIG. 1 may be well-trained by using large scale training data and may be used for multiple applications in a variety of domains. The training data may include single source domain data or multiple source domain data across diverse domains.

The input signal is fed into the input layer 20 in the DNN 10 and then the DNN 10 outputs result from the output layer 40. Parameters of the DNN 10, which may include weights between each units and biases of each unit, are optimized by appropriate training algorithm so as to classify the input signal correctly. In automatic speech recognition (ASR) systems, the DNN 10 may output observation probability over HMM states for input acoustic features.

As described above, the well-trained DNN 10 can present good accuracy for in-domain data covered by training-domain data, which has been used to train the DNN 10. However, its accuracy may deteriorate for data from an out-of-domain since the lower hidden layer 32 can't extract suitable abstracted representation from the out-of-domain data due to difference in signal recording environment, origin of signal, etc. Thus, typically domain adaptation may be required or desirable in order to utilize the well-trained DNN 10 for an out-of-domain data.

However, as described above, most of known domain adaptation approaches may require additional computational cost for run-time recognition, supervised information and/or modification of network topology. Also, the supervised adaptation method sometimes does not work well. So there are needed a technique capable of adapting a model for recognition processing such as DNNs to target-domain data without involving any additional computation during recognition processing, without requiring any supervised information, and preferably without modifying network topology of the model.

Therefore, in one or more embodiments according to the present invention, a novel domain adaptation process is provided to adapt a model for recognition processing, in which one or more parameters of a part of the model are tuned so that difference between distributions from the part of the model derived from a training-domain data and a target-domain data becomes small. In preferable embodiments, the model for recognition processing may include a neural network with an input layer and a plurality of layers on top of the input layer, and the part of the model may be one or more lower layers among the plurality of the layers and the input layer in the neural network. The distributions may be output or activation distributions of the part of the neural network by feeding the training-domain and target-domain data into the input layer.

Since the part of model is adjusted so that the part can transform the data of the target-domain into a space of the training-domain, difference between the target-domain and the training-domain can be preferably absorbed at the part of the model, which enables the data of the target-domain to leverage discriminative capability provided by the remaining part of the model. Therefore, the model adapted by the novel domain adaptation process can have improved accuracy for the target-domain data. Any additional computation during the recognition processing is not involved and any supervised information is not required. In the particular embodiments, improvement of accuracy for the target-domain data can be achieved without modifying network topology of the neural network.

Now, referring to the series of FIGS. 2-7, there are shown computer systems and methods for adapting a model for recognition processing to a target-domain according to one or more embodiments of the present invention.

First referring to the series of FIGS. 2-5, it will be described a computer system and method for adapting a recognition model according to a first embodiment of the present invention, in which a DNN-based acoustic model for speech recognition is adapted in unsupervised manner.

Even though the novel domain adaptation process does not require any supervised information, however, supervised information can be helpful for further improving the accuracy of the model if available. Referring to the series of FIGS. 6-7, it will be described a computer system and method for adapting a recognition model according to a second embodiment of the present invention, in which a DNN-based acoustic model for speech recognition is adapted by utilizing further available supervised information.

First Embodiment

Figure 2:
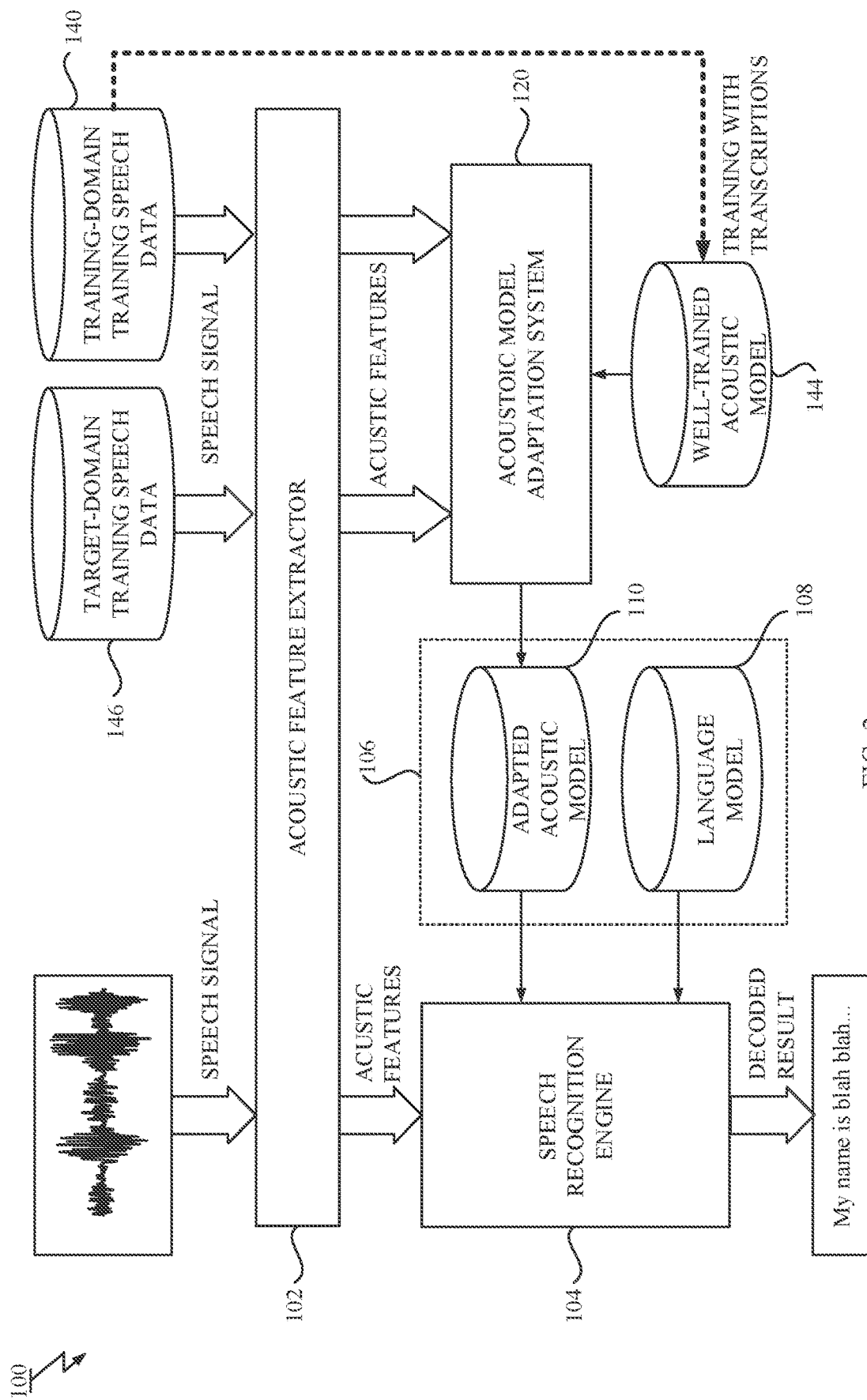
FIG. 2 illustrates a block diagram of a speech recognition system according to a first embodiment of the present invention.

FIG. 2 illustrates a block diagram of a speech recognition system according to a first embodiment of the present invention. As shown in FIG. 2, the speech recognition system 100 may include an acoustic feature extractor 102 that receives speech signals and extracts acoustic features from the received speech signals; a speech recognition engine 104 that receives the extracted acoustic features and outputs a decoded result based on speech recognition models 106; and an acoustic model adaptation system 120.

The acoustic feature extractor 102 receives the speech signals digitalized by sampling analog audio input, that may be input from a microphone for instance, at a predetermined sampling frequency and a predetermined bit depth. The acoustic feature extractor 102 extracts the acoustic features from the received speech signal by any known acoustic feature analysis and then outputs a sequence of the extracted acoustic features. The speech signal may be provided as an audio file, an audio stream from recording device such as microphone, or an audio stream via network socket.

In an embodiment, the acoustic features include, but not limited to, MFCC (Mel Frequency Cepstral Coefficient), LPC (Linear Predictive Coding) Coefficient, PLP (Perceptual Liner Prediction) Cepstral Coefficient, log mel spectrum, raw input features, or any combinations thereof. The acoustic features may further include dynamical features such as delta feature and delta-delta feature of the aforementioned acoustic features.

The speech recognition engine 104 receives the sequence of the extracted acoustic features and predicts most plausible speech contents based on the speech recognition models 106.

The speech recognition models 106 may include a language model 108 and an acoustic model 110. The language model 108 is a model representing probability distribution of word sequence and may be, but not limited to, n-gram model or neural network based model. The acoustic model 110 is a model representing relationship between input acoustic features and linguistic units constituting a speech. The acoustic model 110 will be described in more detail later.

Thus, the speech recognition engine 104 finds a word sequence with maximum likelihood by integrating the language model 108 and the acoustic model 110 based on the sequence of the acoustic features provided from the acoustic feature extractor 102, and outputs the word sequence found as the decoded result.

As described above, domain adaptation may be required or desirable if a target-domain for recognition processing is not identical to the training-domain for training a model. The target-domain may be different from the training-domain. The target-domain may be a specific part of the training-domains when the model is trained by using data from diverse domains. In the ASR system, the target-domain may be different from the training-domain in terms of speaker, an attribute of speaker, recording environment, coding configuration, audio transmission condition, speaking style, speaking rate, etc. Such difference may affect accuracy of the speech recognition.

For this purpose, the acoustic model adaptation system 120 performs a novel domain adaptation process according to the first embodiment of the present invention to prepare the adapted acoustic model 110 used in actual speech recognition based on a well-trained acoustic model 144. Among the speech recognition model 106, the acoustic model 110 may be a target of the novel domain adaptation process.

The acoustic model adaptation system 120 performs the novel domain adaptation process using given training data to adapt the well-trained acoustic model 144 to a particular target-domain. In the describing embodiment, training-domain training speech data 140 and target-domain training speech data 146 are provided as the training data for the domain adaptation. The training speech data 140 and 146 both include a plurality of utterances but may not include corresponding transcriptions. The training-domain training speech data 140 includes speech signals obtained from the training-domain and that has been used for training the acoustic model 144. The target-domain training speech data 146 includes speech signals obtained from the target-domain and may be prepared for adaptation.

The acoustic model adaptation system 120 performs the method for adapting the acoustic model 144 according to the first embodiment of the present invention. The novel domain adaptation process will be described in more detail later.

In particular embodiments, each of modules 102, 104, 108, 110, 120, 140, 144 and 146 described in FIG. 2 may be, but not limited to, implemented as a software module including program instructions and/or data structures in conjunction with hardware components such as a processor, a memory, etc.; as a hardware module including electronic circuitry; or as a combination thereof. These modules 102, 104, 108, 110, 120, 140, 144 and 146 described in FIG. 2 may be implemented on a single computer device such as a personal computer and a server machine or over a plurality of devices such as a computer cluster of the computer devices in a distributed manner.

Figure 3:
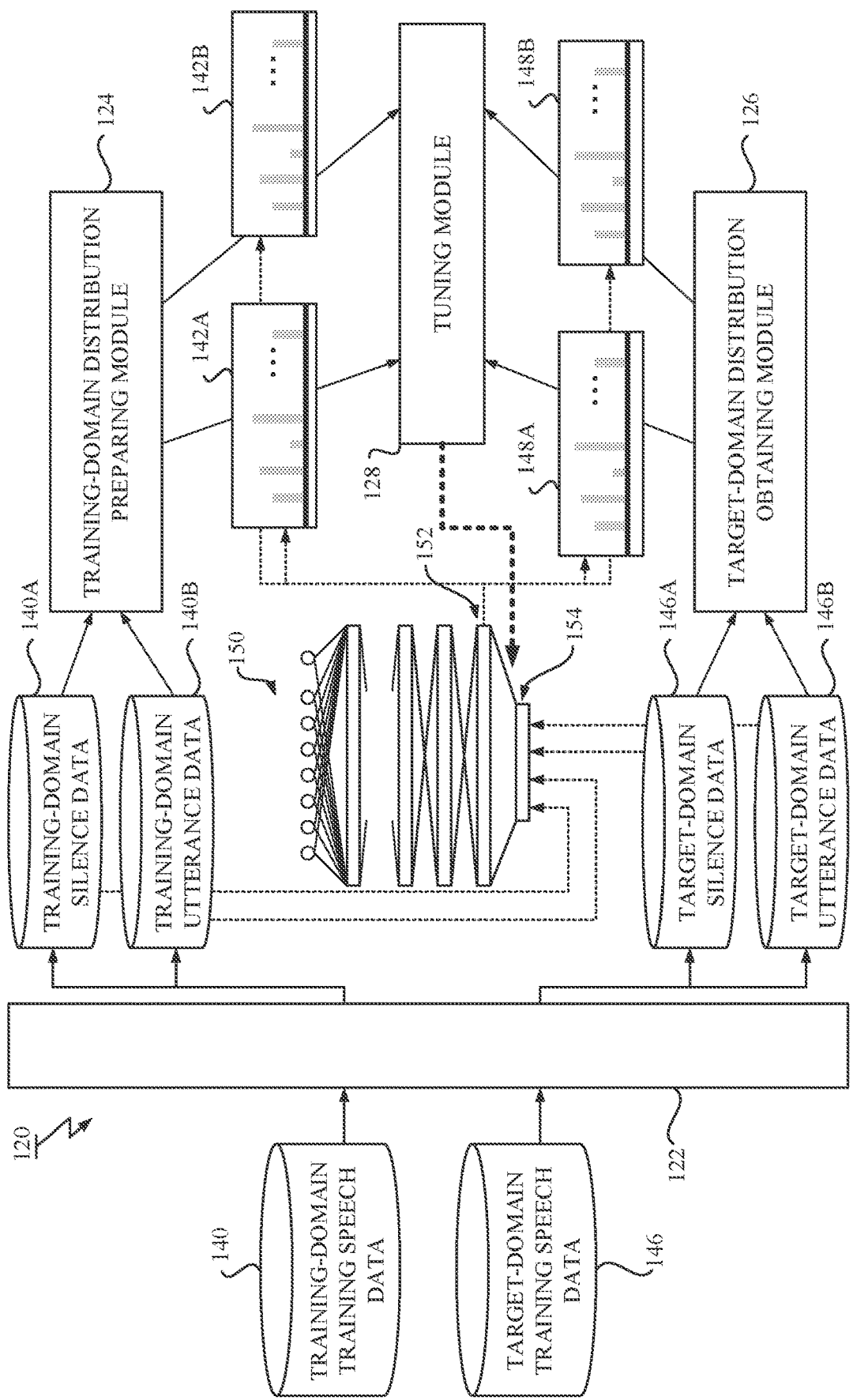
FIG. 3 shows a schematic flow for adapting a DNN-based acoustic model according to the first embodiment of the present invention.

Referring to FIG. 3, a schematic flow for adapting a DNN-based acoustic model is described. In FIG. 3, a DNN 150 constituting the acoustic model 110, 144 is shown. The DNN 150 of the acoustic model 110, 144 can be based on any one of known neural network architectures including FFNNs, CNNs, RNNs, etc. The DNN 150 may include one or more hidden layers between an input layer and an output layer. The DNN 150 outputs result from the output layer in response to feeding the input into the input layer. In the describing embodiment, substantially, the DNN 150 shown in FIG. 3 is a target of the novel domain adaptation process.

In the describing embodiment, the acoustic model 110, 144 may be a DNN-based acoustic model that is a hybrid DNN/HMM system, where the DNN is used to directly compute observation probability distribution for each HMM state instead of standard Gaussian Mixture Models (GMM) in the GMM/HMM system. However, the acoustic model 110, 144 is not limited to the aforementioned DNN-based acoustic model. In other embodiment, the acoustic model 110, 144 may be other type of DNN-based acoustic models that is based on tandem approach, where the DNN is used to extract features as input for standard GMM/HMM system in place of or in addition to standard acoustic features.

By referring to FIG. 3, a more detailed module configuration of the acoustic model adaptation system 120 is described. As shown in FIG. 3, the acoustic model adaptation system 120 includes a training-domain distribution preparing module (hereinbelow, simply referred to as the preparing module) 124; a target-domain distribution obtaining module (hereinbelow, simply referred to as the obtaining module) 126; and a tuning module 128.

The preparing module 124 is configured to prepare an output distribution for the training-domain (hereinbelow, referred to as the training-domain output distribution) 142 from a part of the DNN 150. The training-domain output distribution 142 is derived from data of the training-domain training speech data 140.

Typically, the training-domain output distribution 142 can be obtained by feeding one or more data from the training-domain training speech data 140 into the input layer 154 of the DNN 150 and acquiring output distribution from the part (e.g. the lowest layer 152) of the DNN 150, as depicted by dotted arrows. Note that the data may be converted to a form of the acoustic features by the acoustic feature extractor 102 before feeding into the input layer 154. Unless otherwise noticed, speech data or signal to be fed into the DNN 150 is in a form of the acoustic features. The output distribution can be calculated by, but not limited to, averaging outputs from the part (e.g. the lowest layer 152) over the training examples. The obtained training-domain output distribution 142 may be stored on an appropriate memory device.

In the describing embodiment, the training-domain output distribution 142 is described to be obtained by feeding the training-domain data during the novel domain adaptation process. However, in other embodiment, the training-domain output distribution 142 may be given as a training data set accompanied by the well-trained acoustic model 144, and the preparing module 124 can read from the training data set to prepare the distribution on the memory device.

The obtaining module 126 is configured to obtain an output distribution for the target-domain (hereinbelow, referred to as the target-domain output distribution) 148 from the part of the DNN 150. The target-domain output distribution 148 can be calculated by feeding one or more data from the target-domain training speech data 146 into the input layer 154 of the DNN 150 and acquiring output distribution from the part (e.g. the lowest layer 152) of the DNN 150 as depicted also by other dotted arrows. The output distribution may be calculated by, but not limited to, averaging outputs from the part (e.g. lowest layer 152) over the training examples. Note that the part used by the obtaining module 126 is identical to the part used by the preparing module 124. The target-domain output distribution 148 may be also stored on an appropriate memory device.

The tuning module 128 is configured to tune one or more parameters of the part (e.g. the lowest layer 152) of the DNN 150 so that difference (or distance) between the training-domain output distribution 142 and the target-domain output distribution 148 becomes small, as depicted by thick dotted arrow. Note that initial values of the one or more parameters before parameter tuning are given from the well-trained acoustic model 144. Specifically, the tuning module 128 calculates a change in the parameters with gradient of a loss function that represents the difference between the output distributions 142 and 148, and updates the parameters based on the calculated change. The one or more parameters of the part of the DNN 150 may move to an improving direction in a search space. Any known optimization algorithms including, but not limited to, stochastic, mini-batch or batch gradient descent methods, etc., can be used for tuning the parameters of the part of the DNN 150.

In particular embodiments, the difference may be calculated by means square error or cross-entropy, and the loss function can be set with using the means square error or the cross-entropy accordingly. However, metric of the difference may be not limited to aforementioned examples, any known loss functions can be used to evaluate the difference (or distance) between the output distributions 142 and 148.

The obtaining module 126 repeatedly obtains the output distribution 148 and the tuning module 128 repeatedly tunes the one or more parameters of the part until the difference between the distributions 142, 148 meets a predetermined convergence condition.

In one or more embodiments, the part of the DNN 150, from which the output distributions are acquired and to which the parameter tuning is performed, may be any one or more of intermediate layers and an input layer in the DNN

150. In a preferable embodiment, one or more lower layers among the plurality of the layers and the input layer can be used as the part for parameter tuning and acquiring output. In a more preferable embodiment, one or more lowest layer 152 among the plurality of the layers and the input layer can be used as the part for parameter tuning and acquiring output. In a further more preferable embodiment, parameters of the lowest layer can be tuned based on output distributions from the lowest layer, which may be a minimum configuration. Furthermore, the part from which the output distributions are acquired may be or may not be identical to the part to which the parameter tuning is performed. For example, parameters of the lowest layer can be tuned based on output distributions from second layer above the lowest layer.

Referring further to FIG. 3, the acoustic model adaptation system 120 may include a splitting module 122. The splitting module 122 is configured to split data from both the training speech data 140 and 146 into a plurality of classes. In the describing embodiment, the plurality of the classes includes a class representing utterance regions and a class representing silence regions. Therefore, training-domain silence data 140A and training-domain utterance data 140B are prepared by the splitting module 122 from the training-domain training speech data 140. Also, target-domain silence data 146A and target-domain utterance data 146B are prepared by the splitting module 122 from the target-domain training speech data 146.

Accordingly, the preparing module 124 and the obtaining module 126 may obtain output distributions for each class. Therefore, a training-domain output distribution for silence region 142A and a training-domain output distribution for utterance region 142B may be prepared by the preparing module 124. Also, a target-domain output distribution for silence region 148A and a target-domain output distribution for utterance region 148B may be obtained by the obtaining module 126. The tuning module 128 may calculate difference (or loss) for each class and combine the calculated differences (loss) over the plurality of the classes. Typically, the calculated differences are summed up to evaluate overall difference.

In the describing embodiment, the utterance regions and the silence regions both are separately evaluated and results from the each region are combined for parameter tuning. This is preferable configuration in terms of improvement in accuracy. However, in other embodiment, merely utterance region split from whole speech signals can be evaluated for parameter tuning. In further other embodiment, speech signal may be evaluated together regardless of whether the speech signal is in the utterance regions or the silence regions. In this embodiment, the tuning module 128 may calculate difference for both silence and utterance regions to directly evaluate overall difference. Among aforementioned configurations, evaluating merely utterance regions is preferable, and evaluating the utterance regions in combination with the silence regions is more preferable.

Hereinabove, detailed module configuration of the acoustic model adaptation system 120 has been described with referring to FIG. 3. In particular embodiments, the DNN 150, which is a target for the adaptation, and the modules 122, 124, 126, 128 constituting the acoustic model adaptation system 120 described in FIG. 3 may also be, but not limited to, implemented as a software module in conjunction with a hardware component, as a hardware module, or as a combination thereof.

Figure 4:
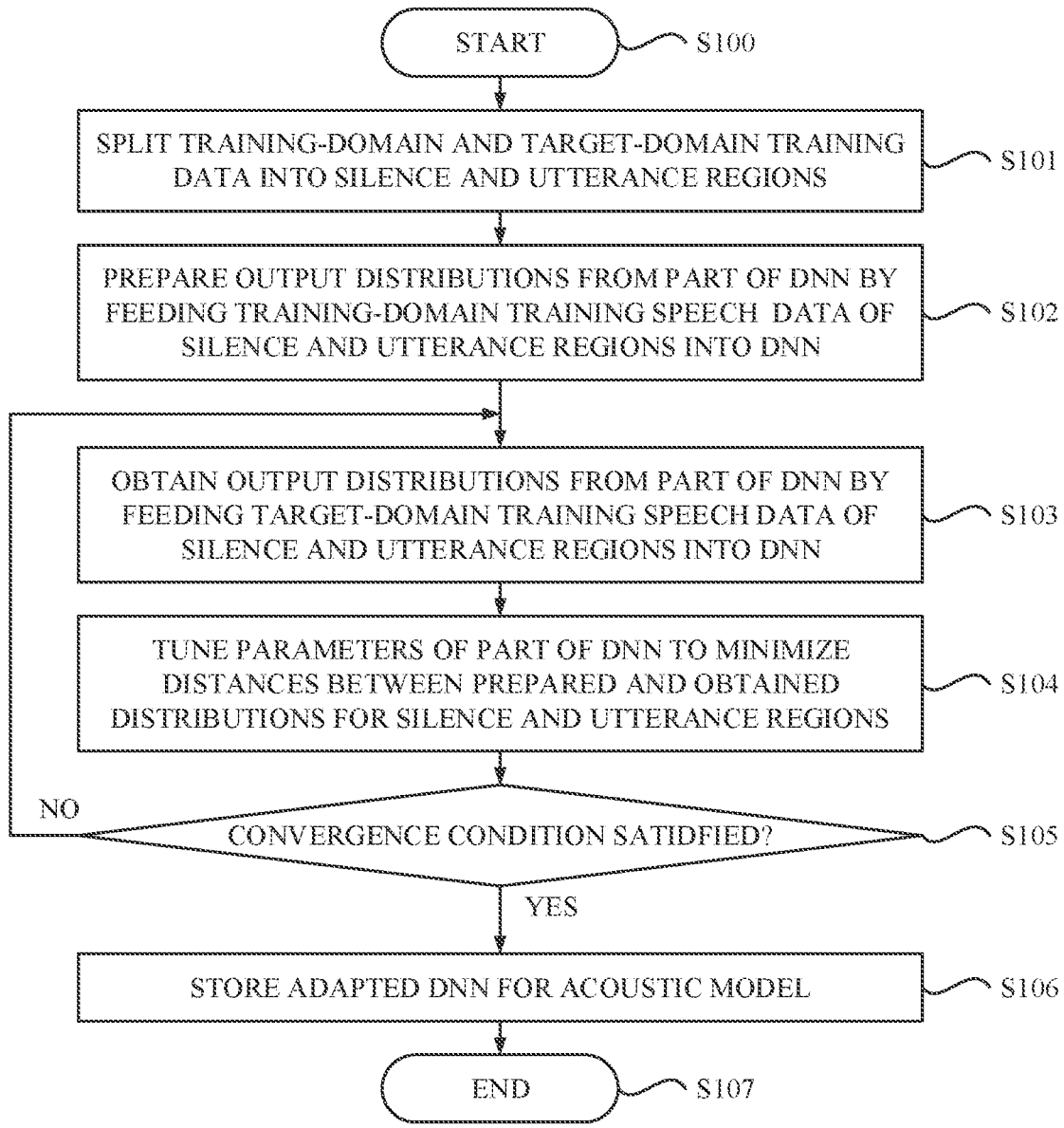
FIG. 4 is a flowchart depicting a process for adapting the DNN-based acoustic model according to the first embodiment of the present invention.

FIG. 4 shows a flowchart depicting a process for adapting the DNN-based acoustic model according to the first embodiment of the present invention. As shown in FIG. 4, process begins at step S100. Note that the process shown in FIG. 4 may be performed by a processor that executes program of the acoustic model adaptation system 120 shown in FIG. 2, for the given training speech data 140, 146.

At step S101, the acoustic model adaptation system 120 reads the training-domain and target-domain training speech data 140 and 146 via the acoustic feature extractor 102, and splits the training speech data into the silence and utterance regions by splitting module 122. The silence and utterance regions can be detected by appropriate signal analysis in an unsupervised manner.

At step S102, the acoustic model adaptation system 120 prepares output distribution 142A and 142B from the part of the DNN 150, by the preparing module 124, by feeding one or more data of silence and utterance regions into the input layer 154 of the DNN 150 and by acquiring output distribution from the part of the DNN 150.

Figure 5:
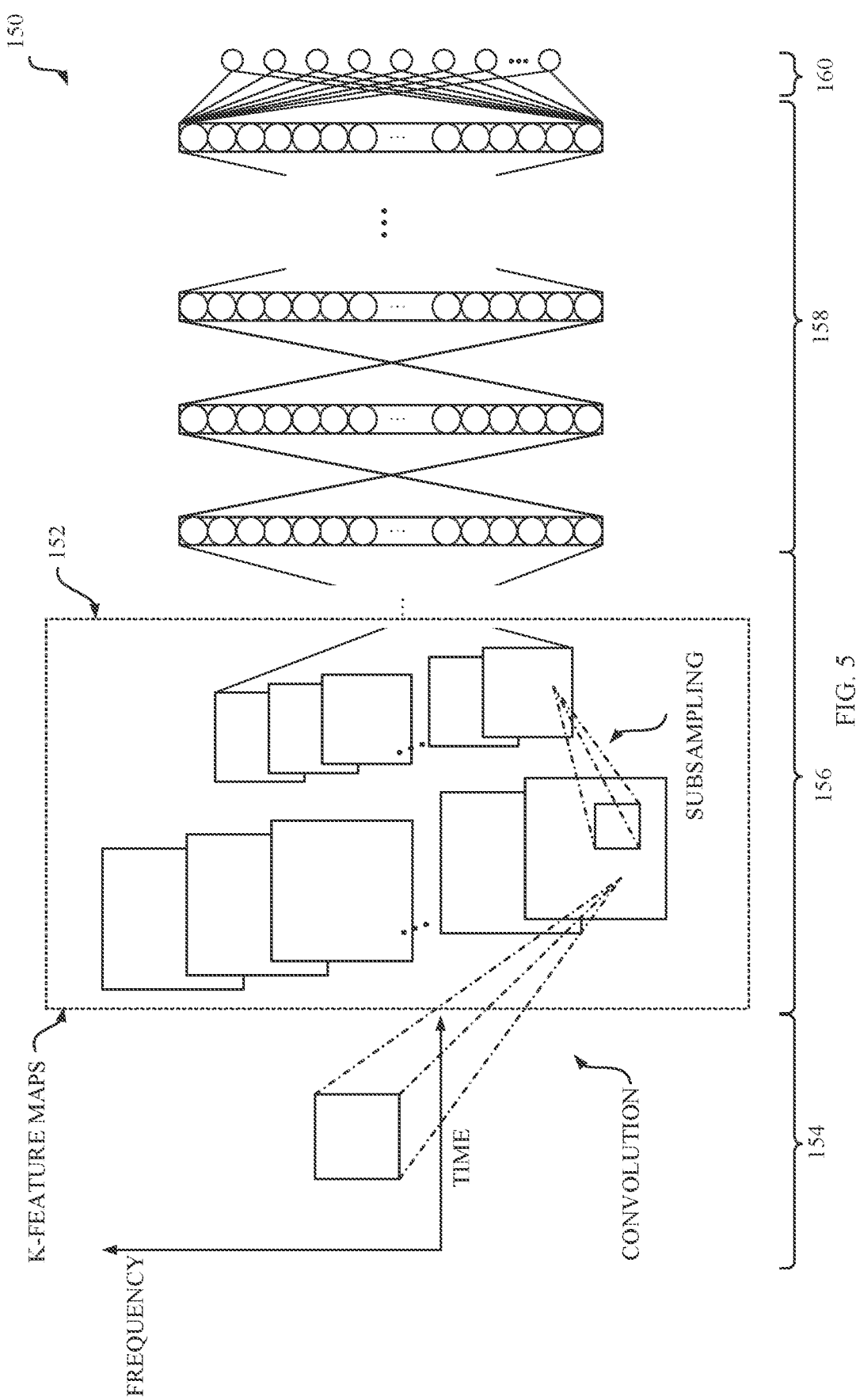
FIG. 5 depicts an exemplary architecture of the DNN used for the acoustic model, which includes one or more convolutional layers followed by one or more fully-connected layers, according to the first embodiment of the present invention.

Referring to FIG. 5, an exemplary architecture of the DNN 150 used for the acoustic model 110, 144 is depicted. The DNN 150 depicted in FIG. 5 includes an input layer 154, one or more convolutional layers 156, one or more fully-connected layers 158 and an output layer 160.

A plurality of consecutive feature frames may be used as input for the DNN 150. Each frame includes feature vector extracted from original speech data by the acoustic feature extractor 102. The input of the DNN 150 can be represented as 2-dimensional space in time (e.g. frames) and frequency (e.g. frequency band) axes.

The one or more convolutional layers 156 includes one or more sets of a convolutional layer followed by a subsampling layer. A hidden unit in the convolutional layer takes inputs from a square region (e.g. n frame×m frequency bands) of the input layer 154, and multiplies those local inputs by using a localized filter (weight matrix). The weights of the localized filter may be shared across entire input space. The convolutional layer accommodates totally K feature maps generated with different localized filters, each of which is constituted by units sharing the same weights. Convolution along frequency axis and/or time axis may be applied. The subsampling layer takes inputs from a local region of the previous convolutional layer and down-samples the inputs with a subsampling operation. The sub region of the subsampling may be or may not be overlapped. The examples of subsampling operations may include, but not limited to, max-pooling, average pooling and stochastic pooling, each of which outputs maximum value, average value or picked value by stochastic procedure within each sub region, respectively.

The one or more fully-connected layers 158 take the output of all units from the previous layer to perform class discrimination. The output layer 160 outputs posterior probability over targets corresponding to the central frame while each input of the DNN 150 is constituted from consecutive feature frames centering at a time. Note that states of HMMs, which may be mono-phone HMMs or multi-phone HMMs, are used for targets. The mono-phone HMMs are context-independent models. On the other hand, the multi-phone HMMs are context-dependent models. One of the most popular models is tri-phone model where each distinct phone model for every different left and right phone context are used.

The number of the sets in the one or more convolutional layers 156 and the number of the hidden layers in the one or more fully-connected layers 158 may be set with appropriate value.

If the DNN 150 includes at least one set of the convolutional and subsampling layers as shown in FIG. 5, the part 152 of the DNN may include the convolutional and subsampling layers, and the distributions may be output distributions from the subsampling layer on top of the convolutional layer. Also one or more parameter to be tuned by the tuning module 128 may include the weight matrixes for the plurality of the localized filters for convolution. By this configuration, even though the model includes the convolutional and subsampling layers, adaptation can be achieved appropriately since information actually discarded in the subsampling layer can be preferably ignored during adaptation.

Referring back to FIG. 4, at step S103, the acoustic model adaptation system 120 obtains output distribution 148A, 148B from the part 152 of the DNN 150 by the obtaining module 126 by feeding data of silence and utterance regions into the input layer 154 of the DNN 150 and by acquiring output distribution from the part 152 of the DNN 150.

At step S104, the acoustic model adaptation system 120 tunes the parameters of the part 152 of the DNN 150 by the tuning module 128 to minimize the loss function representing overall difference (sum of difference between output distributions 142A and 148A for silence regions and difference between output distributions 142B and 148B for utterance regions). The tuning module 128 calculates a change in the parameters with gradient of the loss function and updates the parameters based on the calculated change along with improving direction in the search space.

At step S105, the acoustic model adaptation system 120 determines whether a convergence condition is satisfied or not. The convergence condition may be a criterion based on a metric measuring convergence of the optimization or a stopping criterion such as the number of iteration, for examples. If the acoustic model adaptation system 120 determines that the convergence condition is not satisfied in step S105 (NO), the process loops back to step S103 for further iteration. If the acoustic model adaptation system 120 determines that the convergence condition is satisfied in step S105 (YES), the process branches to step S106.

At step S106, the acoustic model adaptation system 120 stores the currently obtained parameters of the DNN 150 for the acoustic model 110 and the process ends at step S107.

In the describing embodiment, the whole of the DNN 150 is included in the acoustic model 110. The obtained acoustic model 110 based on the hybrid DNN/HMM system outputs calculated acoustic score based on the estimated posterior probabilities over the HMM states.

In the DNN 150 adapted by the process described in FIGS. 2-5, the part 152 of the DNN 150 may be adjusted so that the part 152 can transform the data of the target-domain into a space of the training-domain. Difference between the target-domain and the training-domain can be preferably absorbed at the part 152 of the DNN 150. The data of the target-domain can leverage discrimination capability provided by the remaining part originating from the well-trained DNN 150. After the adaptation of the DNN 150, the DNN 150 can output probabilities over states of the HMM with better accuracy even though the input is from an out-of-data of training-domain.

Therefore, the DNN 150 adapted by the novel domain adaptation process according to the first embodiments of the present invention can have improved accuracy for the target-domain data. Any supervised information is not required for the novel domain adaptation process. Furthermore, it is not necessary to modify conclusive topology, which is defined by the number of the layers and the number of the units in input, intermediate and output layers, hence, no extra computational cost during the recognition processing is expected, thereby improving the recognition accuracy without increasing computational cost during the speech recognition processing.

Also, the DNN 150 adapted by the novel domain adaptation process may acquire capability to extract well abstracted representation for the data of the target-domain. Therefore, an additional training by using target-domain training speech data with manual transcriptions may be worth trying.

The languages, to which the invention may be applicable, is not limited and may include, but by no means limited to, Arabic, Chinese, English, French, German, Japanese, Korean, Portuguese, Russian, Spanish for instance.

Second Embodiment

Now referring to the series of FIGS. 6-7, it will be described a computer system and method for adapting a model for recognition process according to the second embodiment of the present invention.

A block diagram of a speech recognition system according to the second embodiment of the present invention is almost same as that of the first embodiment shown in FIG. 2. An acoustic model adaptation system 120 performs a novel domain adaptation process according to the second embodiment of the present invention to prepare an adapted acoustic model 110 used in actual speech recognition based on a well-trained acoustic model 144.

Figure 6:
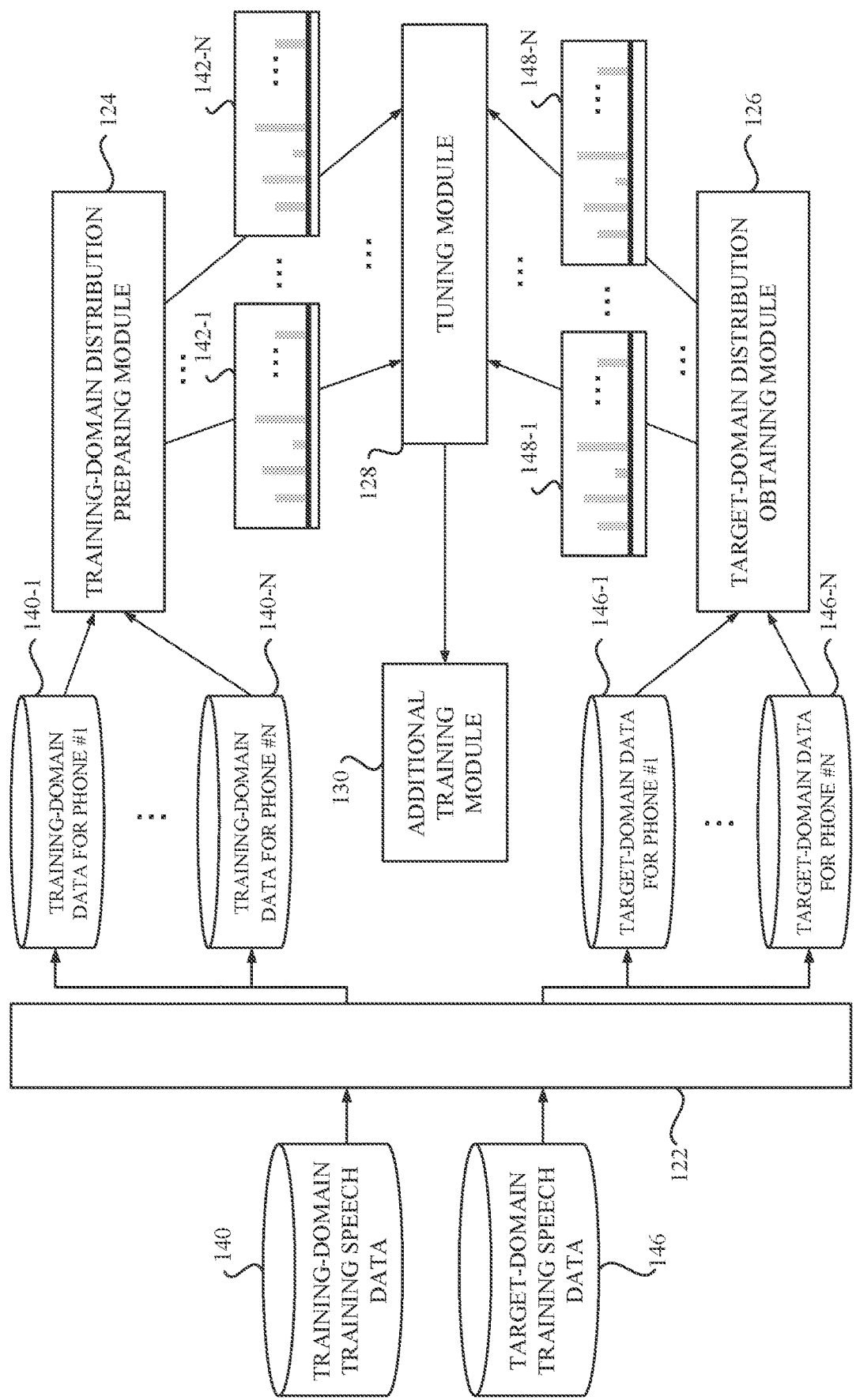
FIG. 6 shows a schematic flow for adapting a DNN-based acoustic model according to a second embodiment of the present invention.

FIG. 6 shows a schematic flow for adapting a DNN-based acoustic model according to the second embodiment of the present invention. Referring to FIG. 6, a detailed module configuration of the acoustic model adaptation system 120 is described. The acoustic model adaptation system 120 includes a splitting module 122, a training-domain distribution preparing module (hereinbelow, similar to the first embodiment, simply referred to as the preparing module) 124; a target-domain distribution obtaining module (hereinbelow, also simply referred to as the obtaining module) 126; a tuning module 128 and an additional training module 130. In the second embodiment, a DNN constituting the acoustic model 110, 144 is also target of the domain adaptation.

Since the configuration of the second embodiment has similarity to the first embodiment, hereinafter, mainly features different from the first embodiment will be focused.

In the second embodiment, training speech data 140 and 146 are given with supervised information which may include manual transcription. Correspondingly, the acoustic model adaptation system 120 performs the novel domain adaptation process to the DNN-based acoustic model by utilizing available supervised information.

The splitting module 122 is configured to split data from both the training speech data 140 and 146 into a plurality of classes similar to the first embodiment. In the second embodiment, the plurality of the classes includes each class representing a phone (e.g. /a/, /i/, /u/ . . . ). Therefore, training-domain data for a plurality of phones 140-1~140-N(N is number of classes) are prepared by the splitting module 122 from the training-domain training speech data 140. Also, target-domain data for the plurality of the phones 146-1~146-N are prepared by the splitting module 122 from the target-domain training speech data 146.

In the describing embodiment, the phones are used as the classes for splitting the training speech data 140, 146. However, the classes are not limited to aforementioned example. In other embodiment, the plurality of the classes may include, but not limited to, a group of the phones (e.g. vowel and consonant phones). In the training speech data 140, 144, the phone may be assigned to each frame as a label. The labels can be aligned to each frame by forced alignment technique based on standard GMM/HHM system using the corresponding manual transcription. The transcription is typically transcribed by human experts and is used to produce correct labels for each utterance.

In further other embodiments, the plurality of the classes may include a group of the multi-phone. In the training speech data 140, 144, the multi-phone such as bi-phone, tri-phone may also be aligned to each frame by the forced alignment technique using the corresponding manual transcriptions.

In the second embodiment, the preparing module 124 and the obtaining module 126 obtain output distributions for each class. Therefore, training-domain output distributions for the plurality of the phones 142-1~142-N are prepared by the preparing module 124. Also, target-domain output distributions for the plurality of the phones 148-1~148-N are obtained by the obtaining module 126. The tuning module 128 calculates difference (or loss) for each class and combines the calculated differences (losses) over the plurality of the classes. Typically, the calculated differences are summed up to evaluate overall difference.

After the part of the DNN is tuned by the tuning module 128, the part of the DNN acquires capability to extract well abstracted representation for the data of the target-domain. Therefore, an additional training may be worth trying. The additional training module 130 is configured to perform an additional training to the tuned DNN by using target-domain training speech data 146 with a label in a supervised manner. Any known adaptation algorithms can be used for the additional training of the DNN.

Figure 7:
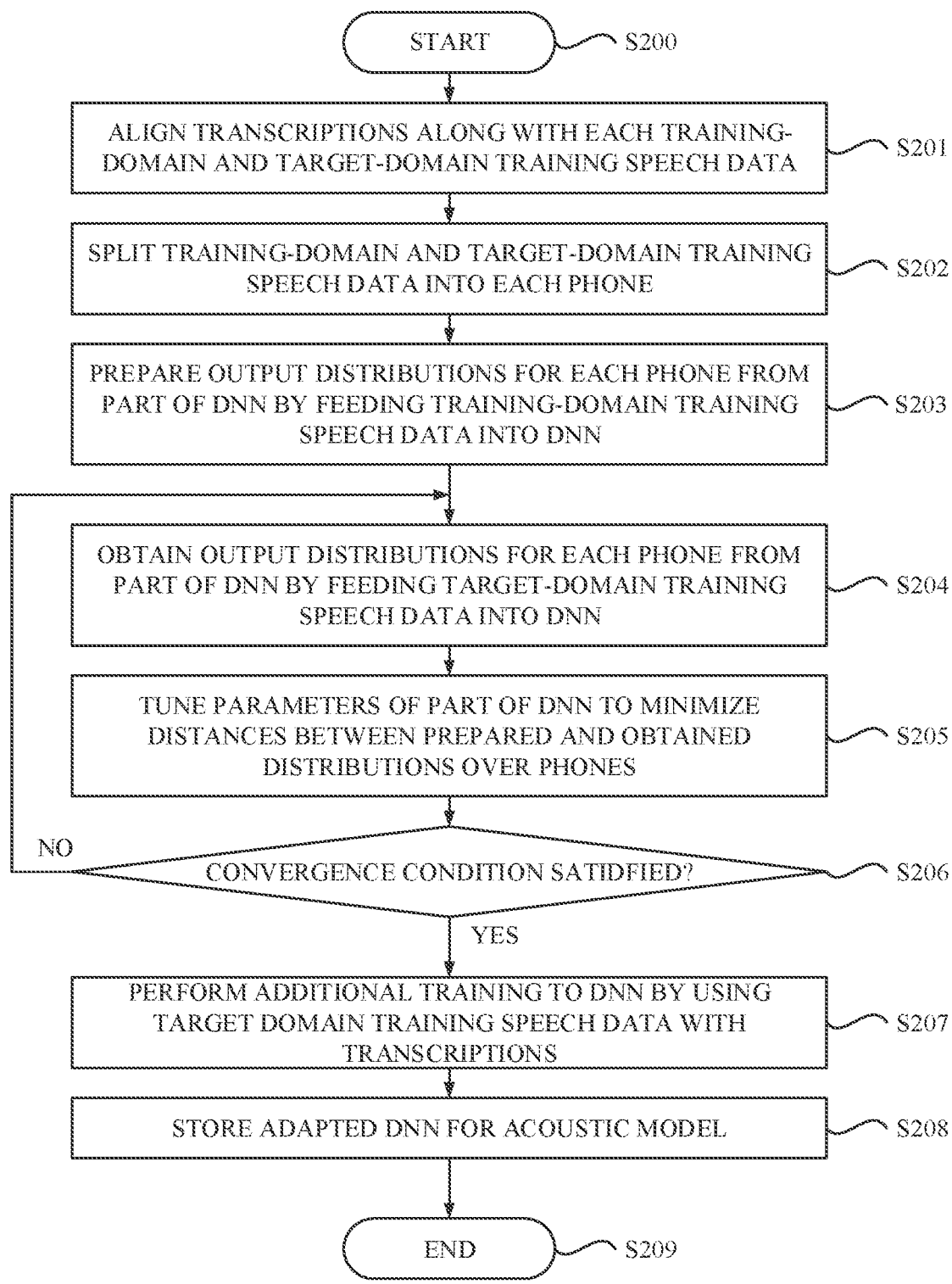
FIG. 7 is a flowchart depicting a process for adapting the DNN-based acoustic model according to the second embodiment of the present invention.

FIG. 7 shows a flowchart depicting a process for adapting the DNN-based acoustic model according to the second embodiment of the present invention. As shown in FIG. 7, process begins at step S200. Note that the process shown in FIG. 7 may be performed by a processor that executes program of the acoustic model adaptation system 120 described with FIG. 6, for the given training speech data 140, 146 with transcription.

At step S201, the acoustic model adaptation system 120 reads each training speech data 140, 146 via the acoustic feature extraction, and aligns the transcription along with each training speech data by the forced alignment. At step S202, the acoustic model adaptation system 120 splits the training speech data into a plurality of phones by the splitting module 122.

At step S203, the acoustic model adaptation system 120 prepares output distribution 142-1~142-N from the part of the DNN, by the preparing module 124, by feeding one or more data of each phone region into the input layer of the DNN and by acquiring output distribution from the part of the DNN.

At step S204, the acoustic model adaptation system 120 obtains output distribution 148-1~148-N from the part of the DNN, by the obtaining module 126, by feeding data of each phone region into the input layer of the DNN and by acquiring output distribution from the part of the DNN.

At step S205, the acoustic model adaptation system 120 tunes the parameters of the part of the DNN 150 by the tuning module 128 to minimize the loss function representing overall difference between distributions from the part of the DNN (sum of difference between output distributions 142-$x$ and 148-$x$ ($x$=1, . . . N) over the phones). The tuning module 128 calculates a change in the parameters with gradient of the loss function and updates the parameters based on the calculated change along with improving direction in the search space.

At step S206, the acoustic model adaptation system 120 determines whether a convergence condition is satisfied or not. If the acoustic model adaptation system 120 determines that the convergence condition is not satisfied in step S206 (NO), the process loops back to step S204 for further iteration. If the acoustic model adaptation system 120 determines that the convergence condition is satisfied in step S206 (YES), the process branches to step S207.

At step S207, the acoustic model adaptation system 120 may perform the additional training to the DNN, by the additional training module 130, by using target-domain training speech data 146 with a label, which is obtained at step S201 from the transcriptions, in a supervised manner. Note that the additional training is optional and processing in step S207 may be omitted.

At step S208, the acoustic model adaptation system 120 stores currently obtained parameters of the DNN for the acoustic model and the process ends at step S209.

According to the second embodiment, the phones, which have different characteristic each other, are separately evaluated and results from the each phone are combined for parameter tuning. Therefore, the accuracy of the model can be improved since the data having different characteristics is separately taken into consideration. Also, by performing additional training to the tuned DNN, accuracy of the DNN can be expected to be further improved.

Other Embodiment

Furthermore, above-mentioned necessity of domain adaptation may arise in various recognitions other than the speech recognition. In other embodiment, there is provided a computer system and method for adapting a recognition model, in which a model is used in other recognition processing such as image recognition processing, to which the invention may be applicable, for instance.

Experimental Studies

A program implementing the system and process shown in FIGS. 2-4 according to the first embodiment was coded and executed for given training examples. A CNN-AM as shown in FIG. 5 with convolutional and max-pooling layers, fully-connected layers and input and output layers was created.

First, the CNN-AM was trained by using hundreds of hours of the training speech data (training-domain) including utterances in Japanese. The obtained CNN-AM was used as a comparative example (Comparative Example 1) and initial model for adaptation in examples. Out-of-domain speech data of 7.4 minutes including utterances in Japanese was also prepared as target-domain training speech data for domain adaptation. The training data used to train the CNN-AM was also used as training-domain training data for domain adaptation. Transcription data was not used for the domain adaptation. Each target-domain and training-domain training speech data was split into utterance regions and silence regions. Cross entropy loss function was used to evaluate difference between output distributions from the max-pooling layers for training- and target-domains. Outputs from the max-pooling layers were averaged over training examples of the training-domain and target-domain training speech data to obtain the output distributions.

As a first example (Example 1), the domain adaptation process shown in FIG. 4 was performed to the baseline original CNN-AM by using the target-domain and the training-domain speech data without splitting them into utterance and silence regions. As a second example (Example 2), the domain adaptation process was performed to the baseline by using the target-domain and the training-domain speech data of merely the utterance regions. As a third example (Example 3), the domain adaptation process was performed by the target-domain and the training-domain speech data of both the utterance and silence regions with splitting. In the third example (Example 3), each cross entropy loss function was prepared for both utterance and silence regions, and obtained two losses were summed up for parameter tuning.

In the examples, after the adaptation of the CNN-AM was completed, the neural network from the input layer to the output layer was stored as the acoustic model. The target-domain test speech data with transcriptions was prepared. Then, ASR accuracy of the obtained speech recognition models was evaluated for the examples and the comparative example. CER (Character Error Rate) was utilized as ASR accuracy metric. As further other comparative example (Comparative Example 2), additional training was conducted to the baseline original CNN-AM by using the target-domain training speech data with manual transcriptions with SGD (stochastic gradient decent) algorithm.

Unless otherwise noted, any portions of the speech recognition model except for parameters of the acoustic model were approximately identical between the examples and the comparative examples. The final topologies of the neural network in the examples were identical to that of the comparative examples.

The evaluated results of the examples and the comparative examples are summarized as follows:

| Adaptation conditions | CER[%] | Relative Improvement |
|---|---|---|
| Comparative Example 1 (Baseline without domain adaptation) | 48.6 | — |
| Example 1 (all) | 48.1 | −1.0% |
| Example 2 (only utterance regions) | 47.0 | −3.3% |
| Example 3 (both utterance and silence regions) | 46.8 | −3.7% |
| Comparative Example 2 (Additional Training only) | 49.4 | +1.6% |

The baseline original CNN-AM trained by the training-domain data showed 48.6% CER for target-domain. By comparison with the result of the comparative example, all examples were shown to be reduced CER by approximately 3.7%~1.0%, showing improvement of recognition accuracy. Among the examples, the third example (Example 3) using both utterance and silence regions with splitting showed best improvement. Most of the gain was obtained by focusing on utterance regions and the additional gain was obtained by incorporating silence regions. By referring to the results of the second comparative example (Comparative Example 2), the additional training deteriorated CER to 49.4% even with using manual transcription effort.

As further other example (Example 4) and comparative example (Comparative Example 3), different sets of training examples from further other domain were prepared as target-domain data. The CNN-AM was trained with hundreds of hours of the training data. Data of 13 hours was prepared as target-domain training speech data for domain adaptation. The training data used for training the CNN-AM was used as also training data for domain adaptation. Language of speeches was Japanese. Transcription data was not used for the domain adaptation. Each target-domain and training-domain training speech data was split into utterance regions and silence regions. As an example (Example 4), both the utterance and silence regions with splitting were used, which demonstrated the best improvement in the previous dataset (Example 3). Cross entropy loss functions were prepared for both utterance and silence regions and obtained two losses were summed up for parameter tuning.

The evaluated results of the examples and the comparative example for second dataset are summarized as follows:

| Adaptation conditions | CER[%] | Relative Improvement |
|---|---|---|
| Comparative Example 3 (Baseline without domain adaptation) | 42.7 | — |
| Example 3 (both utterance and silence regions) | 41.0 | −4.0% |

The baseline original CNN-AM trained by the training-domain data showed 42.7% CER for the current target-domain. By comparison with the result of the comparative example, the example was shown to be reduced CER by approximately 4.0%, showing improvement of recognition accuracy. It was confirmed that the proposed domain adaptation process improved accuracy in two different data sets, indicating that the proposed domain adaptation process is not dependent on specific data sets.

Cloud Environment Implementation

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
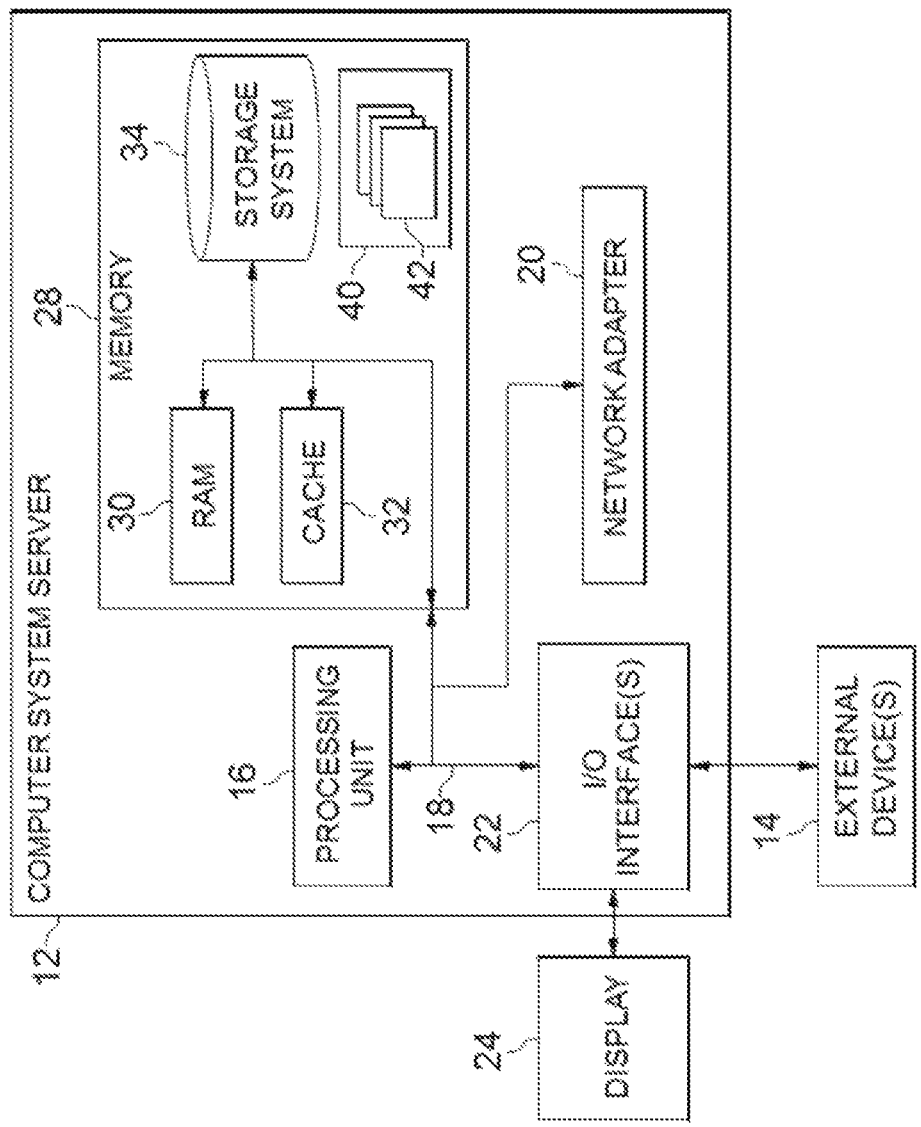
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
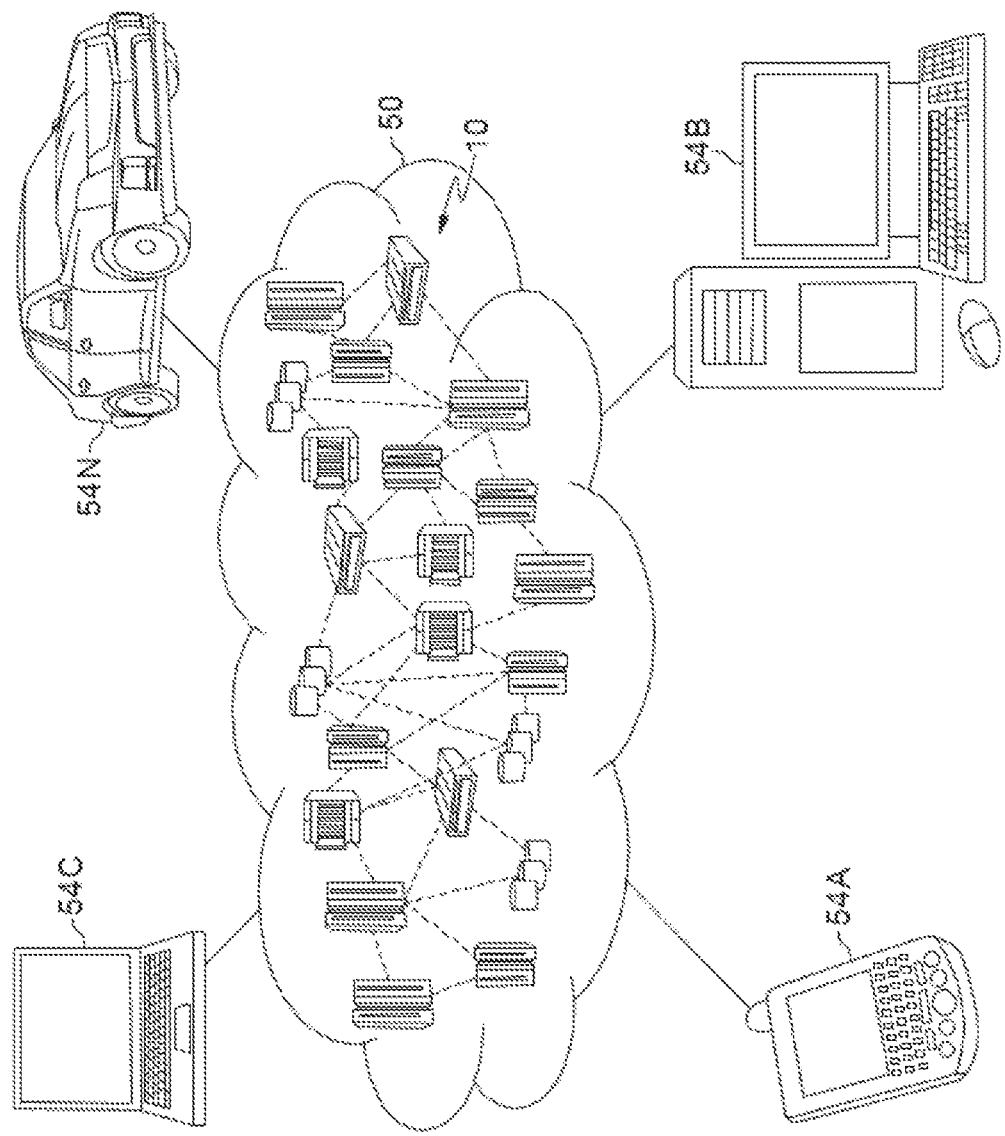
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
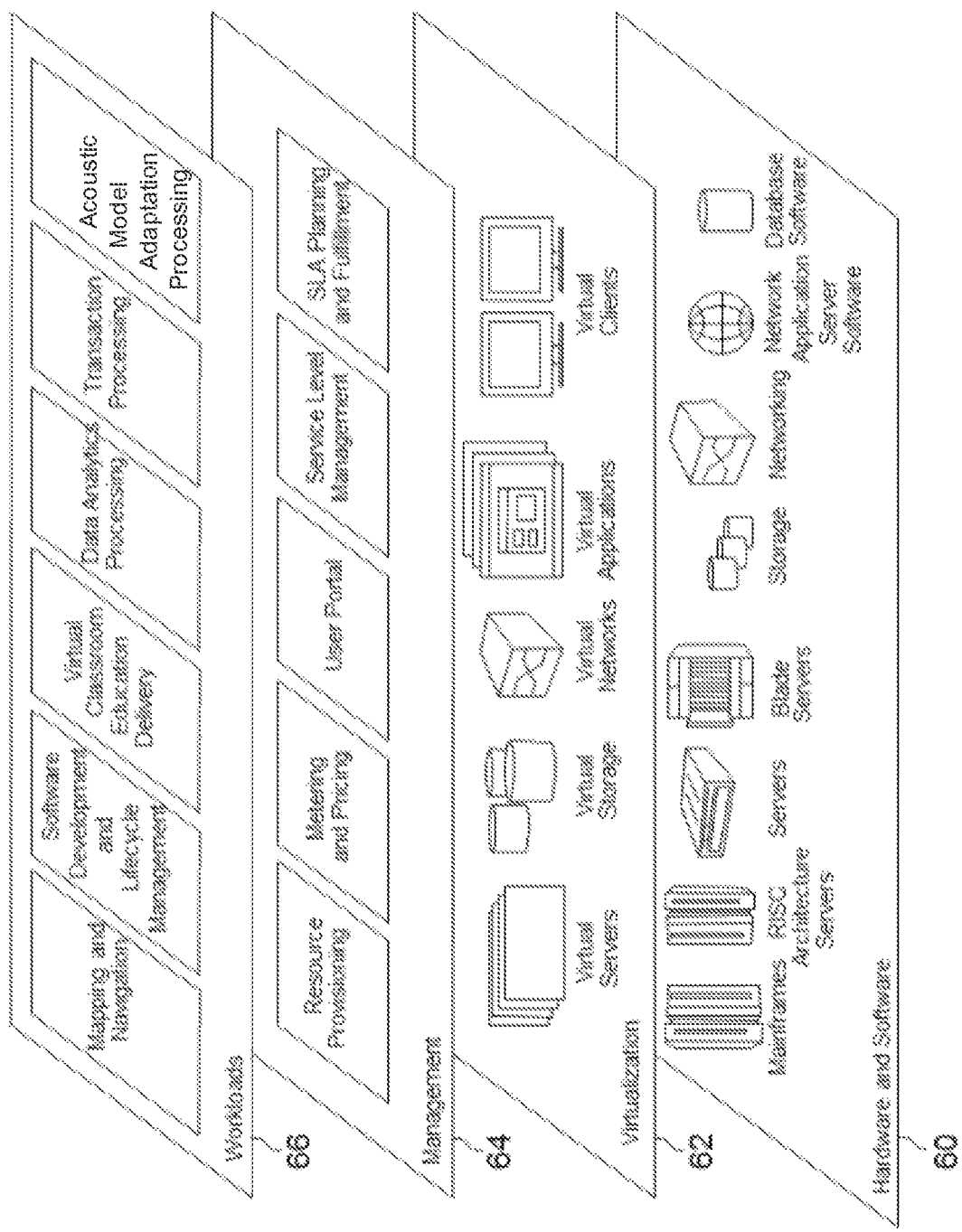
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and acoustic model adaptation processing.

In a particular embodiments, there is provided a computer program product or software that implements the acoustic model adaptation processing in accordance with embodiments described herein, as a service in a cloud environment. In this particular embodiment, any steps of the above-mentioned novel domain adaptation process for the DNN based acoustic model may be performed in the cloud computing environment. The acoustic model adaptation processing may be implemented as a software module including program instructions and/or data structures in conjunction with hardware components provided by hardware and software 60. The above-mentioned novel domain adaptation process can be executed on a single instance of computer or a plurality of instances in a distributed manner. However, this is an example of possible configurations, and the acoustic model adaptation processing in accordance with embodiments described herein can be implemented by using a one or more computing devices such as servers.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for adapting a model for recognition processing to a target-domain, performed by a computer device, the method comprising:
   preparing a first distribution in relation to a part of the model, the first distribution being derived from data of a training-domain for the model;
   obtaining a second distribution in relation to the part of the model by using data of the target-domain; and
   tuning one or more parameters of the of the model based on the data of the target-domain and one or more output distributions from another part of the model so that a difference between the first and the second distributions becomes small by calculating a change in the one or more parameters with gradient of a loss function that represents the difference between the first and the second distributions and updating the one or more parameters based on the calculated change, the one or more parameters comprising weight matrices for a plurality of localized filters for convolution, wherein each of the target-domain and the training-domain data is split into utterance regions and silence regions and the utterance regions and the silence regions are both separately evaluated and results from each of the regions are combined for use in additional parameter tuning.

2. The method of claim 1, wherein the model includes a neural network having an input layer and a plurality of layers on top of the input layer, the part being one or more lower layers among the plurality of the layers and the input layer, the first and second distributions being output distributions from the part by feeding the data into the input layer from the training-domain and the target-domain, respectively.

3. The method of claim 2, wherein the part of the model is one or more lowest layers among the plurality of the layers and the input layer.

4. The method of claim 2, wherein the part includes a convolutional layer and a subsampling layer on top of the convolutional layer, the first and second distributions being output distributions from the subsampling layer.

5. The method of claim 1, wherein the data of the training-domain and the data of the target-domain both include silence and utterance regions, the tuning including:
   calculating at least one difference between the first and the second distributions for both the silence and utterance regions.

6. The method of claim 1, wherein the data of the training-domain and the data of the target-domain are both split into a plurality of classes in an unsupervised manner, the plurality of classes including class representing utterance regions and class representing silence regions, both the first and the second distributions including a distribution for each class, the tuning including:
   calculating at least one difference between the first and the second distributions for each class; and
   combining the at least one calculated difference over the plurality of the classes.

7. The method of claim 1, wherein the data of the training-domain and the data of the target-domain both include utterance regions split from whole data including the utterance regions and silence regions in an unsupervised manner, the tuning including:
   calculating at least one difference between the first and the second distributions for the utterance regions.

8. The method of claim 1, wherein the data of the training-domain and the data of the target-domain are both split into a plurality of classes by utilizing supervised information, the plurality of the classes including each class representing a phone, a group of phones, or a group of multi-phones, both the first and the second distributions including a distribution for each class, the tuning including:
   calculating at least one difference between the first and the second distributions for each class; and
   combining the at least one calculated difference over the plurality of the classes.

9. The method of claim 1, wherein the obtaining the second distribution and the tuning the one or more parameters are iterated until the difference meets a predetermined condition.

10. The method of claim 1, the difference is calculated by means of square error or cross-entropy and a loss function is set using the means square error or the cross-entropy.

11. The method of claim 1, wherein the method further comprises:
    performing an additional training to the tuned model by using training data with a label from the target-domain in a supervised manner.

12. The method of claim 1, wherein the adapted model provides an acoustic model for speech recognition processing.

13. The method of claim 1, wherein the preparing, the obtaining and the tuning are performed in a cloud computing environment.

14. The method of claim 1, wherein the preparing, the Obtaining and the tuning are performed by one or more computer devices.

15. A computer system for adapting a model for recognition processing to a target-domain, by executing program instructions, the computer system comprising:
    a memory tangibly storing the program instructions;
    a processor in communications with the memory, wherein the computer system is configured to:
      prepare a first distribution in relation to a part of the model, the first distribution being derived from data of a training-domain for the model;
      obtain a second distribution in relation to the part of the model by using data of the target-domain; and
      tune one or more parameters of the part of the model based on the data of the target-domain and one or more output distributions from another part of the model so that a difference between the first and the second distributions becomes small by calculating a change in the one or more parameters with gradient of a loss function that represents the difference between the first and the second distributions and updating the one or more parameters based on the calculated change, the one or more parameters comprising weight matrices for a plurality of localized filters for convolution, wherein each of the target-domain and the training-domain data is split into utterance regions and silence regions and the utterance regions and the silence regions are both separately evaluated and results from each of the regions are combined for use in additional parameter tuning.

16. The computer system of claim 15, wherein the model includes a neural network having an input layer and a plurality of layers on top of the input layer, the part being one or more lower layers among the plurality of the layers and the input layer, the first and second distributions being output distributions from the part by feeding the data into the input layer from the training-domain and the target-domain, respectively.

17. The computer system of claim 15, wherein the data of the training-domain and the data of the target-domain both are split into a plurality of classes, both the first and the second distributions including a distribution for each class, the computer system being further configured to:
calculate at least one difference between the first and the second distributions for each class; and
combine the at least one calculated difference over the plurality of the classes.

18. The computer system of claim 15, wherein the computer system is further configured to:
determine whether the difference meets a predetermined condition; and
obtain the second distribution and tune the one or more parameters repeatedly in response to determining that the difference does not meet the predetermined condition.

19. A computer program product for adapting a model for recognition processing to a target-domain, the computer program product comprising a non-transitory computer readable storage medium having program instructions embodied therewith, the program instructions executable by a computer to cause the computer to perform a method comprising:
preparing a first distribution in relation to a part of the model, the first distribution being derived from data of a training-domain for the model;
obtaining a second distribution in relation to the part of the model by using data of the target-domain; and
tuning one or more parameters of the part of the model based on the data of the target-domain and one or more output distributions from another part of the model so that a difference between the first and the second distributions becomes small by calculating a change in the one or more parameters with gradient of a loss function that represents the difference between the first and the second distributions and updating the one or more parameters based on the calculated change, the one or more parameters comprising weight matrices for a plurality of localized filters for convolution, wherein each of the target-domain and the training-domain data is split into utterance regions and silence regions and the utterance regions and the silence regions are both separately evaluated and results from each of the regions are combined for use in additional parameter tuning.

20. The computer program product of claim 9, wherein the model includes a neural network having an input layer and a plurality of layers on top of the input layer, the part being one or more lower layers among the plurality of the layers and the input layer, the first and second distributions being output distributions from the part by feeding the data into the input layer from the training-domain and the target-domain, respectively.

21. The computer program product of claim 19, wherein the data of the training-domain and the data of the target-domain both are split into a plurality of classes, both the first and the second distributions including a distribution for each class, the tuning including:
calculating at least one difference between the first and the second distributions for each class; and
combining the at least one calculated difference over the plurality of e classes.

22. A computer implemented method for adapting a neural network to a target-domain, performed by a processor, the method comprising:
preparing a first output distribution from one or more lower layers of the neural network on a memory operably coupled to the processor, the first output distribution being derived from data of a training-domain for the neural network;
calculating a second output distribution from the one or more lower layers of the neural network by feeding data of the target-domain into the neural network; and
tuning one or more parameters of the one or more lower layers of the neural network based on the data of the target-domain and one or more output distributions from another part of the model by calculating a change in the one or more parameters so as to minimize a difference between the first and the second output distributions based on the first and the second output distributions stored on the memory by calculating a change in the one or more parameters with gradient of a loss function that represents the difference between the first and the second distributions and updating the one or more parameters based on the calculated change, the one or more parameters comprising weight matrices for a plurality of localized filters for convolution, wherein each of the target-domain and the training-domain data is split into utterance regions and silence regions and the utterance regions and the silence regions are both separately evaluated and results from each of the regions are combined for use in additional parameter tuning.

23. The method of claim 22, wherein the one or more lower layers are lowest layers including a convolutional layer on an input layer of the neural network and a subsampling layer on top of the convolutional layer, the first and second output distributions being output distributions from the subsampling layer by feeding the data into the input layer from the training-domain and the target-domain, respectively.

24. A computer system for adapting a model for recognition processing to a target-domain, the computer system comprising:
a preparing module configured to prepare a first distribution in relation to a part of the model, the first distribution being derived from data of a training-domain for the model;
an obtaining module configured to obtain a second distribution in relation to the part of the model by using data of the target-domain; and
a tuning module configured to tune one or more parameters of the part of the model based on the data of the target-domain and one or more output distributions from another part of the model so that a difference between the first and the second distributions becomes small by calculating a change in the one or more parameters with gradient of a loss function that represents the difference between the first and the second distributions and updating the one or more parameters based on the calculated change, the one or more parameters comprising weight matrices for a p orality of localized filters for convolution, wherein each of the target-domain and the training-domain data is split into utterance regions and silence regions and the utterance regions and the silence regions are both separately evaluated and results from each of the regions are combined for use in additional parameter tuning.

25. The computer system of claim 24, wherein the computer system further comprises:
  a splitting module configured to split the data of the training-domain and the data of the target-domain into a plurality of classes; and/or
  an additional training module configured to perform an additional training to the tuned model by using training data with a label from the target-domain in a supervised manner.

* * * * *